(12) United States Patent
Yliaho et al.

(10) Patent No.: US 9,137,592 B2
(45) Date of Patent: Sep. 15, 2015

(54) SPEAKER SUSPENSION

(71) Applicant: Nokia Corporation, Espoo (FI)

(72) Inventors: Marko Tapani Yliaho, Tampere (FI);
Pasi Tuomo Antero Kemppinen,
Tampere (FI); Mikko Tapio Jyrkinen,
Tampere (FI); Thorsten Behles,
Kangasala (FI)

(73) Assignee: Nokia Technologies Oy, Espoo (FI)

( * ) Notice: Subject to any disclaimer, the term of this patent is extended or adjusted under 35 U.S.C. 154(b) by 65 days.

(21) Appl. No.: 14/151,328

(22) Filed: Jan. 9, 2014

(65) Prior Publication Data
US 2015/0195630 A1 Jul. 9, 2015

(51) Int. Cl.
*H04R 9/06* (2006.01)
*H04R 1/00* (2006.01)

(52) U.S. Cl.
CPC ............ *H04R 1/00* (2013.01); *H04R 2307/204* (2013.01); *H04R 2499/11* (2013.01)

(58) Field of Classification Search
CPC ............ B06R 11/0217; B06R 2011/19; B06R 2011/0059; H04N 5/642; H04R 1/02; H04R 1/021; H04R 1/023; H04R 1/025; H04R 1/026; H04R 1/22; H04R 1/345; H04R 1/2811; H04R 1/2888; H04R 7/00; H04R 7/04; H04R 7/06; H04R 7/12; H04R 7/18; H04R 7/20; H04R 7/26; H04R 7/122; H04R 7/045; H04R 5/02; H04R 5/023; H04R 9/06; H04R 9/043; H04R 9/047; H04R 9/066; H04R 17/00; H04R 2499/15; H04R 2201/023; H04R 2307/207

USPC ......... 381/152, 333, 386, 388, 392, 398, 431; 181/148, 166, 171, 172, 198, 199

See application file for complete search history.

(56) References Cited

U.S. PATENT DOCUMENTS 7,151,837 B2 * 12/2006 Bank et al. .................... 381/431
2001/0017924 A1 8/2001 Azima et al. .................. 381/165

(Continued)

FOREIGN PATENT DOCUMENTS

WO WO-2012/025783 A1 3/2012
WO WO-2012/052803 A1 4/2012

(Continued)

*Primary Examiner* — Brian Ensey
(74) *Attorney, Agent, or Firm* — Harrington & Smith

(57) ABSTRACT

An apparatus including a frame; and a speaker connected to the frame. The speaker includes at least one vibrating element and least one display element. The least one vibrating element is configured to at least partially move the at least one display element generate sound waves from the at least one display element. A connection of the speaker to the frame includes a first section at a first location of the at least one display element and a second section at a second location of the at least one display element. The first section includes a soft suspension of the at least one display element between the at least one display element and the frame. The second section includes a harder suspension of the at least one display element between the at least one display element and the frame than the first section. The at least one vibrating element is located away from the second location of the at least one display element and located proximate the at least one display element at the first location of the at least one display element so as to move the at least one display element substantially using the first section based on the soft suspension of the at least one display element.

20 Claims, 12 Drawing Sheets

(56) References Cited

U.S. PATENT DOCUMENTS

| | | | |
|---|---|---|---|
| 2001/0028716 A1 | 10/2001 | Hill et al. | 381/58 |
| 2002/0118847 A1 | 8/2002 | Kam | 381/111 |
| 2005/0025330 A1* | 2/2005 | Saiki et al. | 381/388 |
| 2005/0147274 A1* | 7/2005 | Azima et al. | 381/431 |
| 2006/0140437 A1* | 6/2006 | Watanabe et al. | 381/431 |
| 2006/0181522 A1 | 8/2006 | Nishimura et al. | 345/177 |
| 2012/0149437 A1 | 6/2012 | Zurek et al. | 456/566 |

FOREIGN PATENT DOCUMENTS

| | | |
|---|---|---|
| WO | WO-2012090031 A1 | 7/2012 |
| WO | WO-2012/111348 A1 | 8/2012 |

\* cited by examiner

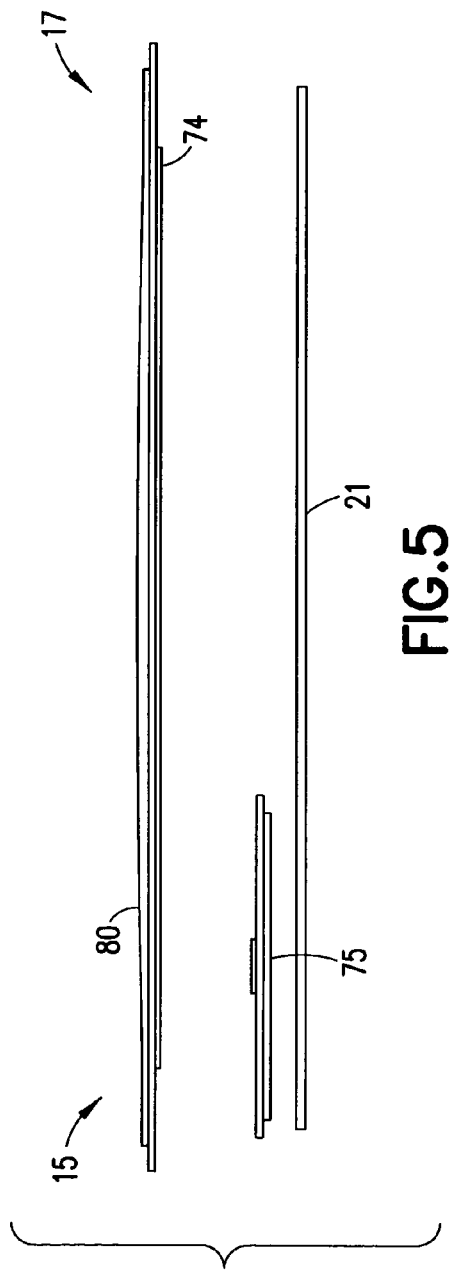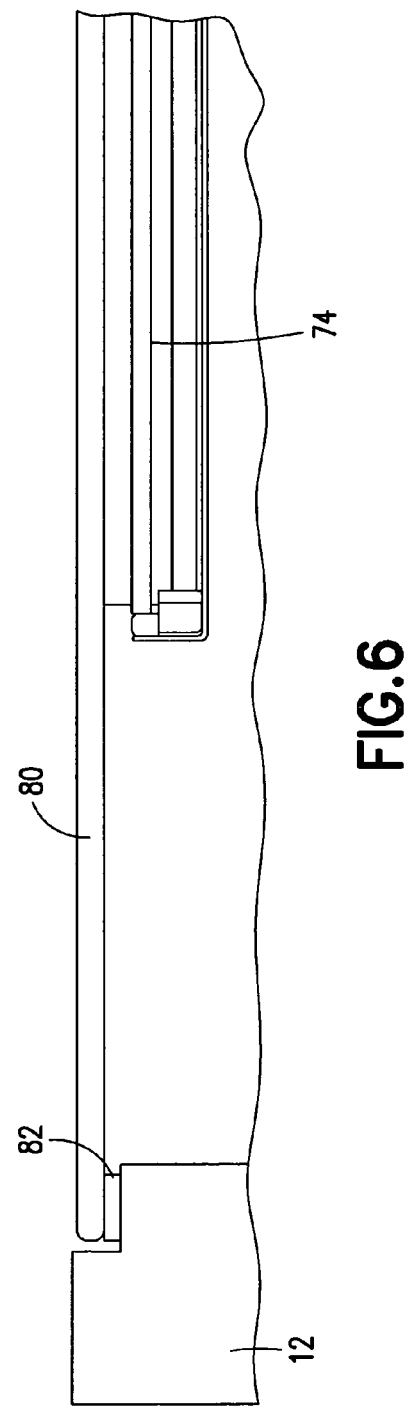

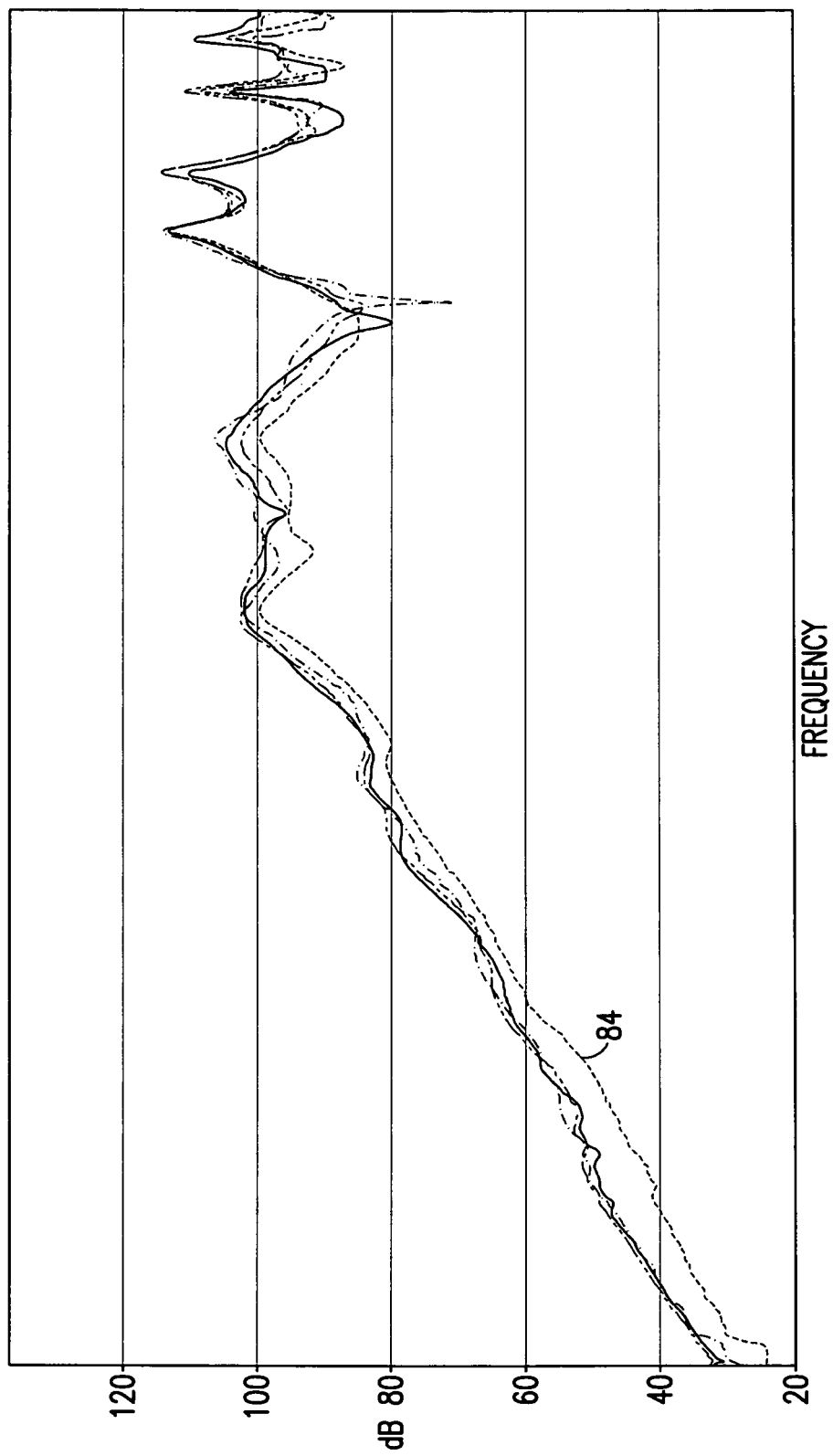

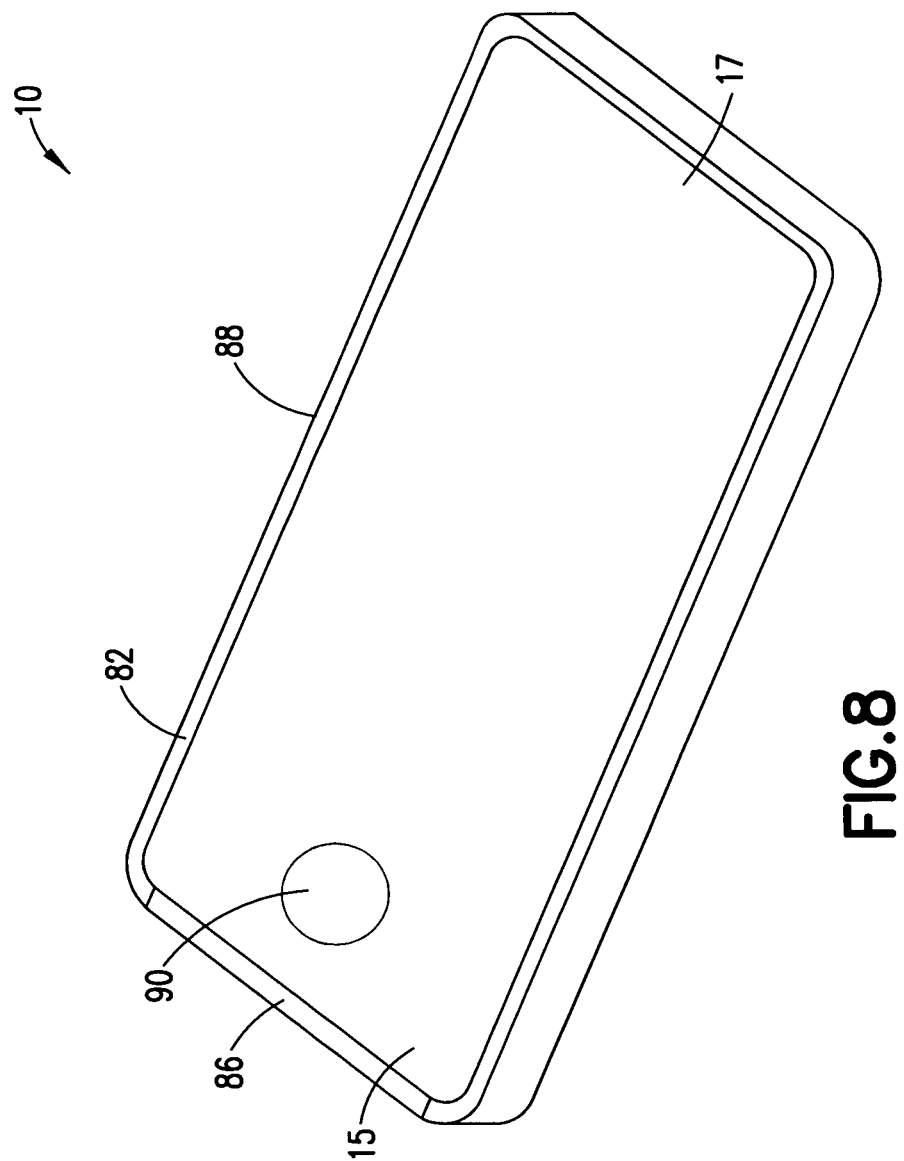

SPEAKER SUSPENSION

BACKGROUND

1. Technical Field

The exemplary and non-limiting embodiments relate generally to a display panel speaker.

2. Brief Description of Prior Developments

Panel displays are becoming more prevalent in devices such as smart phones. Generating sound from a panel display is being investigated.

SUMMARY

The following summary is merely intended to be exemplary. The summary is not intended to limit the scope of the claims.

In accordance with one aspect, an example embodiment may be provided in an apparatus comprising a frame; and a speaker connected to the frame, where the speaker comprises at least one vibrating element and at least one display element, where the at least one vibrating element is configured to at least partially move the at least one display element to generate sound waves from the at least one display element. A connection the speaker to the frame comprises a first section at a first location of the at least one display element and a second section at a second location of the at least one display element, where the first section comprises a soft suspension of the at least one display element between the at least one display element and the frame, where the second section comprises a harder suspension of the at least one display element between the at least one display element and the frame than the first section, and where the at least one vibrating element is spaced from the second location of the at least one display element and located proximate the at least one display element at the first location of the at least one display element so as to move the at least one display element substantially using the first section based on the soft suspension of the at least one display element.

In accordance with another aspect, an example embodiment may be provided in an apparatus comprising a frame; a speaker comprising at least one vibrating element and at least one display element, where the at least one vibrating element is configured to at least partially move the at least one display element to generate sound waves from the at least one display element; and a connector connecting the at least one display element to the frame. The connector has a first section at a first location of the at least one display element and a second section at a second location of the at least one display element, where the first section is more resilient than the second section, and where the at least one vibrating element is spaced from the second location of the at least one display element and located proximate the at least one display element at the first location of the at least one display element so as to move the at least one display element substantially using the first section based on the soft suspension of the at least one display element.

In accordance with another aspect, an example method may comprise connecting a speaker to a frame by a connection, where the speaker comprises at least one vibrating element and at least one display element, where the at least one vibrating element is configured to at least partially move the at least one display element to generate sound waves from the at least one display element, where the connection has a first section at a first location of the at least one display element and a second section at a second location of the at least one display element, where the first section comprises a soft suspension of the at least one display element between the at least one display element and the frame, where the second section comprises a harder suspension of the at least one display element between the at least one display element and the frame than the first section, and where the at least one vibrating element is spaced from the second location of the at least one display element and located proximate the at least one display element at the first location of the at least one display element so as to move the at least one display element substantially using the first section based on the soft suspension of the at least one display element.

BRIEF DESCRIPTION OF THE DRAWINGS

The foregoing aspects and other features are explained in the following description, taken in connection with the accompanying drawings, wherein:

FIG. 5 is a schematic exploded side view of a portion of the apparatus shown in FIG. 1;

FIG. 6 is a partial schematic sectional view of a connection of the display to the frame of the device shown in FIG. 1;

FIG. 7 is a graph charting example measurements of four different suspensions comprised of different materials/structure;

FIG. 8 is a schematic perspective view of the apparatus shown in FIG. 1 illustrating locations of different sections of the suspension shown in FIG. 6;

DETAILED DESCRIPTION OF EMBODIMENT

Figure 1:
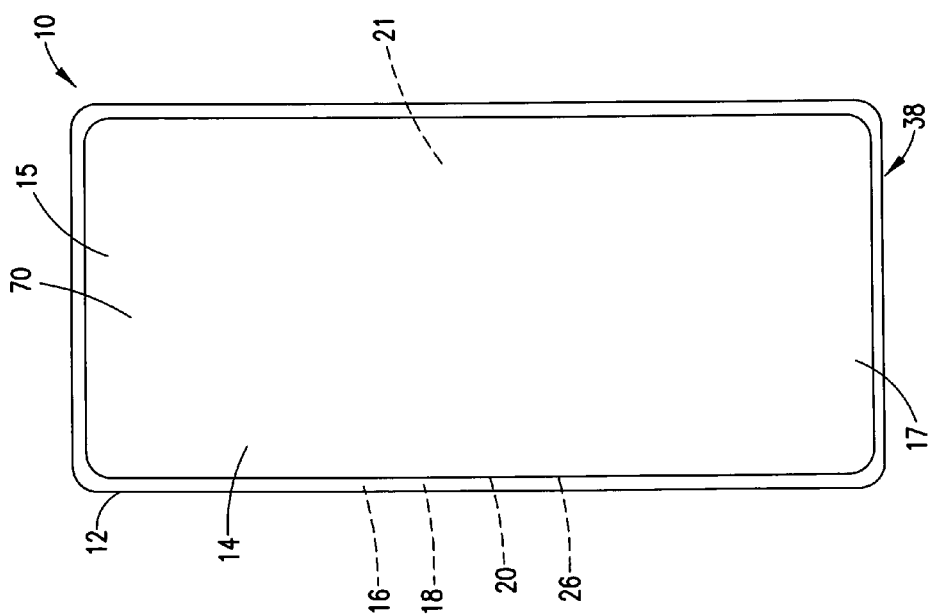
FIG. 1 is a front view of an example embodiment of an apparatus comprising features as described herein.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone. For example, the apparatus might be a gaming device or handset, or video recorder for example.

Figure 2:
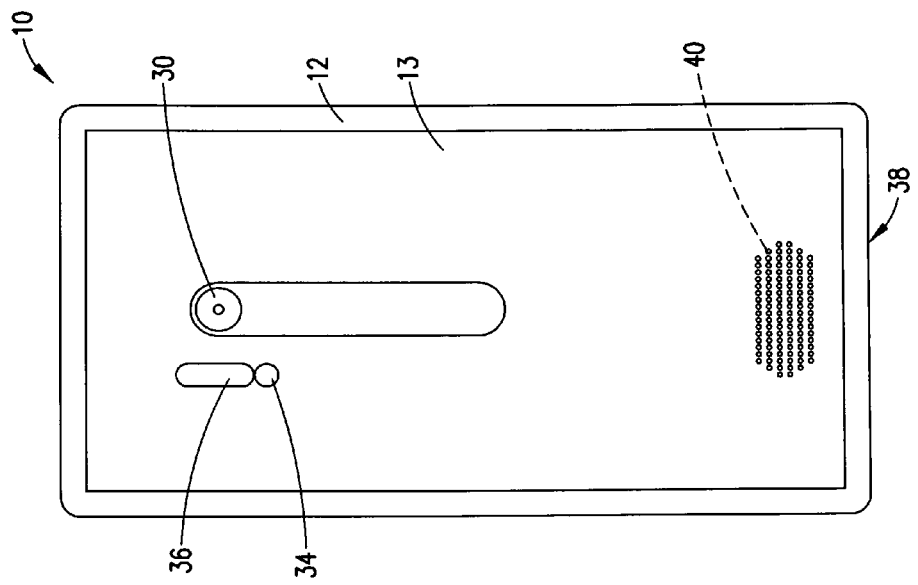
FIG. 2 is a rear view of the apparatus shown in FIG. 1.
Figure 3:
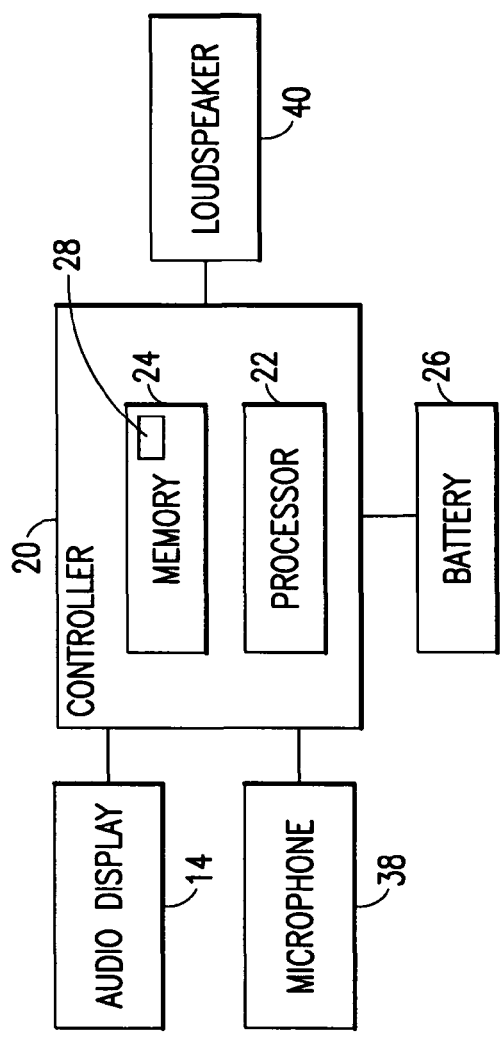
FIG. 3 is a diagram illustrating some of the components of the apparatus shown in FIGS. 1-2.

Referring also to FIGS. 2-3, apparatus 10, in this example embodiment, comprises a housing 12, a display module 14 which includes a touchscreen function, a receiver 16, a transmitter 18, a controller 20, a rechargeable battery 26 and a camera 30. However, all of these features are not necessary to implement the features described below. The receiver and the transmitter may be provided in the form of a transceiver for example. The electronic circuitry inside the housing 12 may comprise at least one printed wiring board (PWB) 21 having components such as the controller 20 thereon. The controller 20 may include at least one processor 22, at least one memory 24, and software 28. The receiver 16 and transmitter 18 form a primary communications system to allow the apparatus 10 to communicate with a wireless telephone system, such as a mobile telephone base station for example.

In this example, the rear side 13 of the apparatus 10 includes the camera 30, an LED 34, and a flash system 36. The LED 34 and the flash system 36 are provided for the camera 30. The camera 30, the LED 34 and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as a microphone 38 and a sound transducer provided as a loudspeaker 40. In an alternate example the apparatus may comprise more than one microphone and/or more than one loudspeaker.

Figure 4:
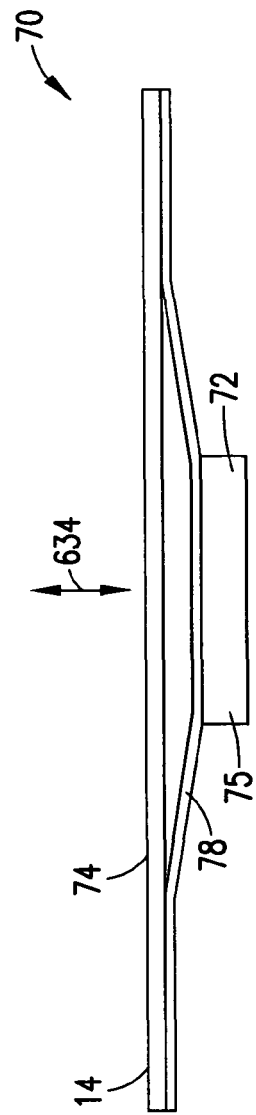
FIG. 4 is a schematic sectional view of the audio display module shown in FIG. 1.

Referring also to FIG. 4, the display module 14, in addition to the touchscreen function, forms an earpiece speaker 70 comprising a vibrating element 72 and a display element 74. The display element 74, in this example, includes the display module 14 that is a touchscreen display in this example; which functions as both a display screen and as a user input. The display element 74 may comprise a touch input device (TID) as the display module 14, such as a capacitive sensor for example. However, features described herein may be used in a display which does not have a touch, user input feature. Alternatively, another example may comprise an apparatus which has touchpad or touch-panel which is not part of an electronic display screen.

In this example the vibrating element 72 comprises a piezoelectric member 75. The piezoelectric member 75 may be electrically connected to the printed circuit board 21. The display element 74 is an electronic display. A member 78 connects the piezoelectric member 75 to the back side of the display element 74. In one example embodiment the piezoelectric member 75 is controllably flexed or vibrated by electricity supplied from the printed circuit board 21. This causes the piezoelectric member 75 to move the electronic display 74 in and out as illustrated by arrow 634 to generate sound waves from the front of the electronic display 74 (and/or the covering window).

Referring also to FIG. 5, in this example the apparatus comprises only one piezoelectric member 75 connected to the back side of the display element 74 at the top end 15 of the display 14. The piezoelectric member 75 is spaced from the bottom end 17 of the display 14. The piezo actuator may be directly coupled to the display module might not be directly coupled to the display module. The earpiece speaker in a broader definition may comprise additional element(s). For example, an earpiece speaker may have a plate under the display module where the piezo may be used to actuate the plate so that the plate could move/vibrate the display in a z-direction (634). The piezo or electromagnetic actuator (EMA) may be placed under the electronic display or directly under the front window. Both types of embodiments work well depending on the display technology. In an embodiment where the display is a LCD display, it is better if the piezo or EMA is connected to the front glass window. However, in an embodiment where the display is an OLED display, it may be better to place the actuator directly under the display, such as in the upper half or third of the display for example. For when the display is an OLED display, the low frequency output may be better if the actuator is placed there. This is because the display package is stiff in this area, going closer to the center point of the display than at the edge of the display. The display can flex better when the actuator pushes at this area. Therefore, the low frequency output may be better. If the actuator is closer to the upper edge of the device it may be hard for the actuator to bend the display, but this may still be appropriate for when the display is an LCD display. When the display is an LCD display, the overall stiffness of the whole display package may be lower than when an OLED is laminated together with a glass window. That is why, when the display is an LCD display, the actuator can be added close to the edge and it still provides good low frequency output. If this were done when the display is an OLED display, the low frequency output might be quite low. When the display is an OLED display the actuator may be placed closest to the center of the device. A front window 80 may be provided as the front face of the display element 74. In an alternate example embodiment, rather than a piezoelectric member, the vibrating element may comprise vibrating of the display with a dynamic actuator such as speaker or vibra. Thus, features as described herein are not limited to using a piezoelectric actuator.

Features as described herein may fundamentally utilize implementation of "Audio Display" or "panel speaker" concept which has been developed by Nokia Corporation. In the Audio Display concept, generally, at least one piezo actuator may be suitably coupled to the display module for sound generation so that the display module can be used as a conventional display, but further for sound generation and perhaps tactile feedback. In alternative embodiments of Audio Display integrations, the piezo actuator may be coupled to the display window 80 (at the front of the display module 14) for sound generation. There are various ways of reproducing sound waves in the direction of the display module. The audio display module 14 is configured to function as a display and also function as a speaker or sound transducer.

As seen in FIG. 3, the audio display 14 is connected to the controller 20. The controller 20 is configured to control display of images on the display element 74, and also control generation of sound from the audio display module 14. The source of the images and sounds may comprise any suitable source(s), such as applications, video, data from the Internet, television signals, etc. The audio signals sent to the audio display module 14 may be formed or controlled by the controller. The audio signals may be telephone voice signals from a telephone conversation. In this example the audio display module 14 is configured to provide an electronic display feature, an audio speaker feature and a haptic feedback feature. However, the haptic feedback feature might not be provided in an alternate embodiment.

Referring also to FIG. 6, a partial cross section of the attachment of the panel speaker to the device frame 12 is shown. Note that in FIG. 6 the actuator 75, which drives the display stack 14, is not shown. The front window 80, such as made of glass, and the rest of the display element 74 are laminated together in this example. In one type of alternative embodiment the front window and the electronic display are not laminated together. A gasket may be provided between the electronic display and the front window in a dead band area(s) to form the display element. The gasket may prevent dust from going in-between the LCD screen (or OLED) and the front glass.

Between the stack, forming the display 14, and the device cover 12 there is suspension 82. The thickness of the suspension 82 in the drawings is only suggestive. With this type of suspension connection 82, the audio performance is not as good as with an audio optimal mounting. However, an audio optimal mounting has disadvantages.

With an audio optimal mounting of an audio display stack a device frame, the display stack may be driven using piezo actuators under the display with a target of getting as "pistonic" movement as possible. For this purpose, the display stack would be suspended very softly, and there would be a bellows between the front window and the device frame. This type of suspension provides, in practice, a least amount of damping for the speaker element i.e. the audio display stack. A soft suspension having a soft bellows around the display for pistonic movement has the undesirable issue(s) that the bellows is very visible, increases the deadband area outside the display, increases thickness, and/or requires more volume from the device. A different design having only having a gap between the display stack and the device frame would be better audio performance, but that is not a practical solution for a mobile phone.

Although the audio performance using the suspension 82 is not as good as with an audio optimal mounting, the suspension 82 provides a less visible connection of the display stack 14 to the frame 12. Referring also to FIG. 7, a graph charting example measurements of the suspension 82 comprised of four different materials/structure, in an otherwise a similar mockup that provides panel speaker earpiece solution, is shown where the suspensions have different hardness and softness. The curve 84 with the worst performance is a result of a hard suspension comprising two sided tape only. By softening the suspension (other curves) there can be loudness increase of several decibels. As shown in FIG. 7, the harder the suspension the worse the audio performance. However, the softer the suspension, the more the display stack "sinks" into the suspension when the display stack is pressed by the user. A soft suspension may give to the user negative feeling about the general quality of the device if the device does not feel like a solid block.

Features as described herein may segment the suspension of the panel speaker in a device that has a display as part of the speaker. The suspension may be softer only in the area(s) where soft suspension is desired for better audio performance, and the suspension may be harder in the area(s) where a softer suspension would not provide significant audio performance benefits. The harder suspension provides a better quality feeling to a user about the device. It may also be beneficial to mechanically block the movement or vibration of the audio display proximate the main microphone; which is typically at the bottom end of a telephone device. With the segmented suspension 82, the harder suspension 88 is provided proximate the microphone 38. In one type of example the hard suspension is provided along a majority of the total hard/soft suspension; along an end proximate the main microphone and along a majority of the lateral sides of the display. Features as described herein may provide a soft suspension noticeable to a user only where the piezo actuator is located at an earpiece functionality location. Therefore, the rest of the area, where the piezo actuator is not located, is a substantially non-moving connection to the frame of the device, and provides a robust feeling to the user rather than a loose feeling. A feature as described herein may, thus, be to allow the audio display to move for sound generation at only one end of the display area, and be substantially non-moving at the rest of the display area (a majority of the display area).

Figure 9:
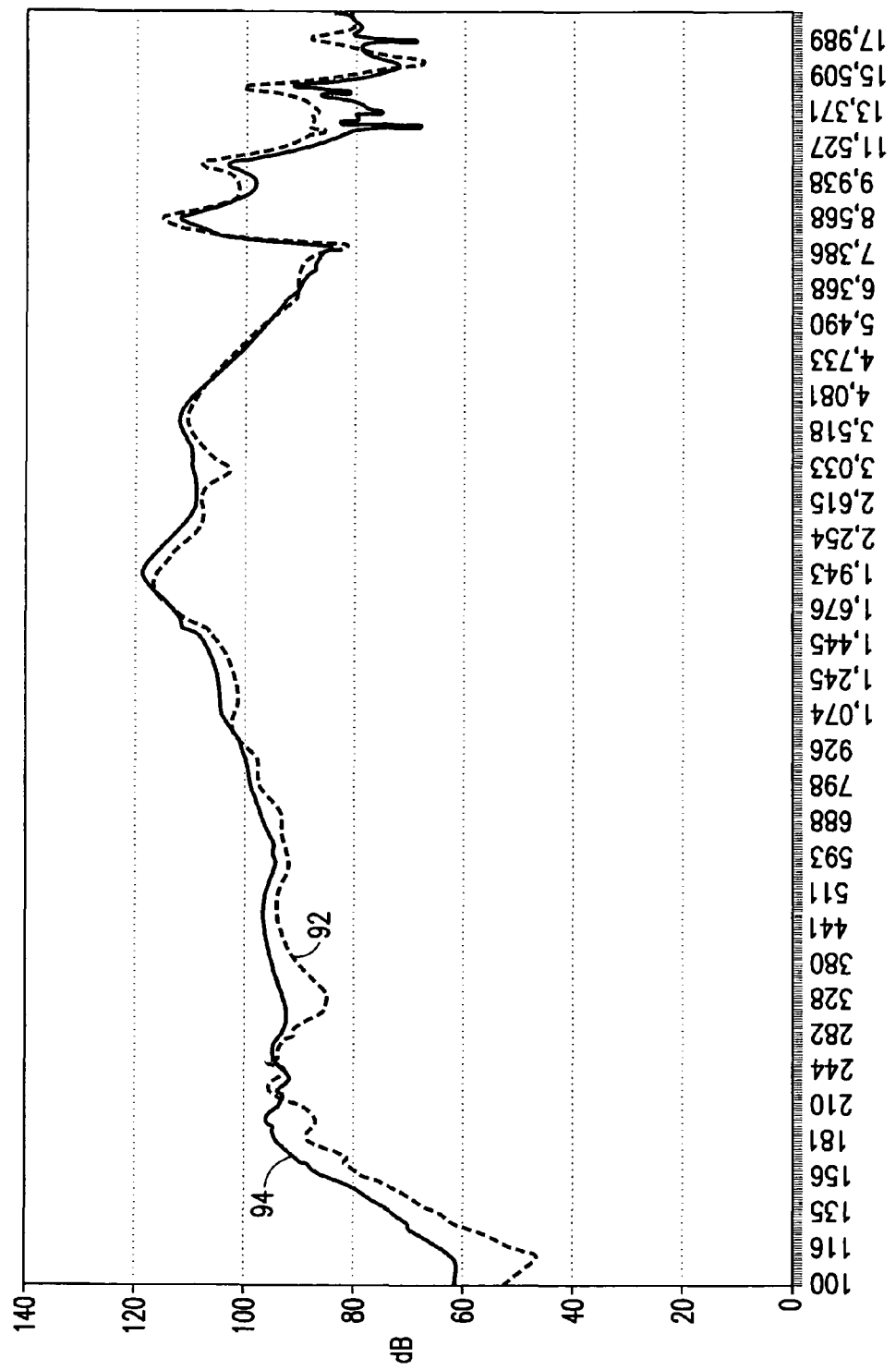
FIG. 9 is a graph representative of frequency responses for a uniformly suspended mockup and a same mockup where the top edge suspension was removed completely.

Referring also to FIG. 8, the suspension 82 in this example comprises a first section 86 and a second section 88. The first section 86 is soft relative to the second section 88; yielding more readily to pressure. The second section 88 is hard relative to the first section 86; yielding less readily to pressure. The soft/hard difference between the two sections 86, 88 may be provided by the material characteristic of the suspension at the first section 86 versus the material characteristic of the suspension the second section 88. For example, the material the first section 86 may be more resilient that the material at the second section 88. The cross sectional shape of the first section 86 may alternatively or additionally be more resilient than the cross sectional shape of the second section 88. In the example shown in FIG. 8, the topmost part 86 of the suspension 82 is soft and the other part 88 of the suspension is harder. The circle 90 denotes the area that is supposed to provide the earpiece functionality. Referring also to FIG. 9, curve 92 represents frequency response of a uniformly suspended mockup and the curve 94 represents the same mockup where the top edge suspension was removed completely. The result is better low frequency reproduction and flatter response. This illustrates that a softer suspension at the end 15, where the area 90 of the earpiece functionality is intended to be provided, may provided better low frequency reproduction and flatter response at the area 90 of the earpiece functionality.

Figure 10:
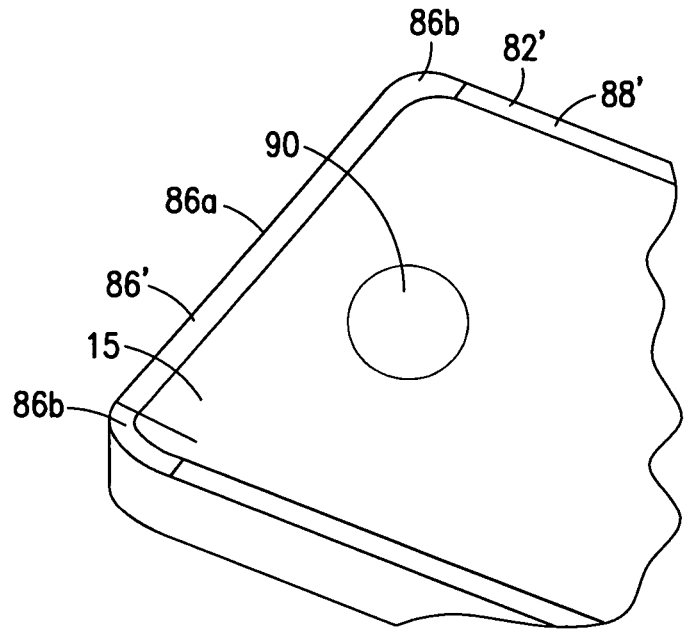
FIG. 10 is a partial perspective view similar to FIG. 8 of an alternate example embodiment.

Referring also to FIG. 10, alternate example embodiment is shown. In this example, the topmost part 86a and the top corners 86b of the suspension 82' form the first section 86' which are soft. The other part 88' the suspension 82' is harder. The circle 90 denotes the area that is supposed to provide the earpiece functionality.

Figure 11:
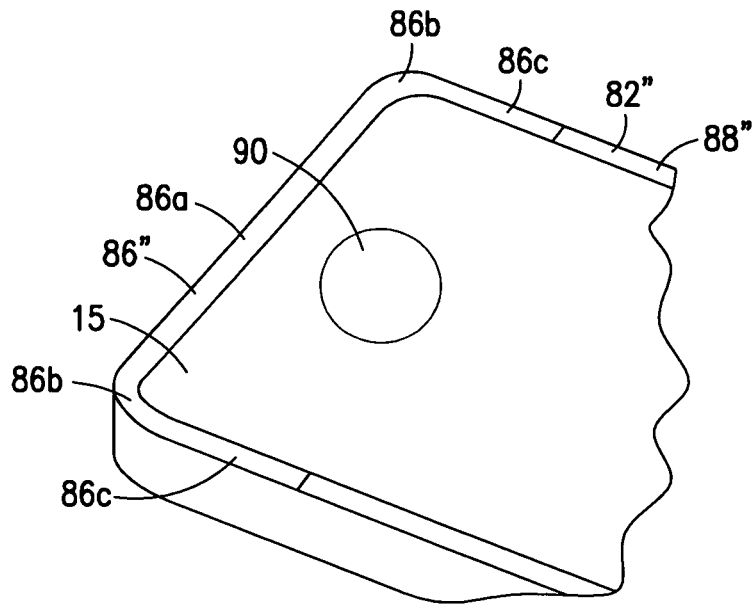
FIG. 11 is a partial respective view similar to FIG. 8 of an alternate example embodiment.
Figure 12:
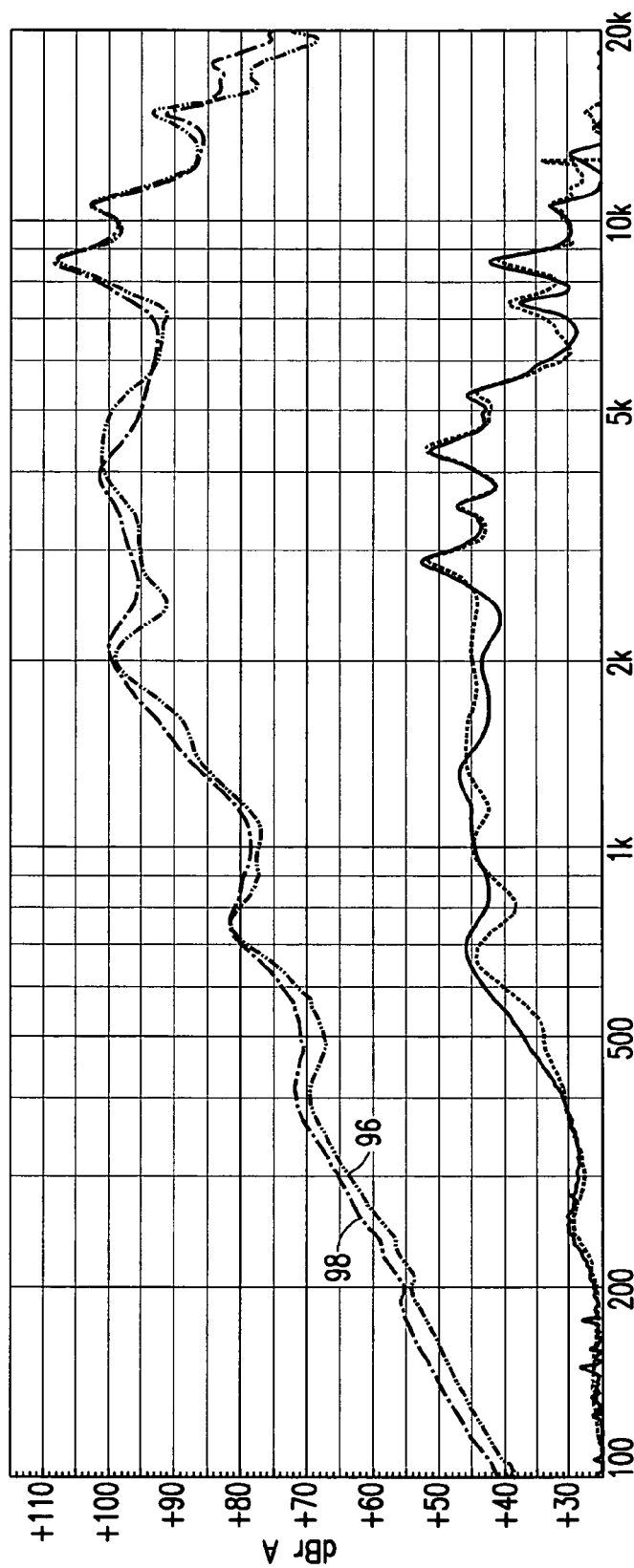
FIG. 12 is a graph of frequency responses of a mockup having a uniformly suspended window with a hard suspension all around, and a similar type of mockup where the top edge suspension as in FIG. 11 was provided with a softer section.

Referring also to FIG. 11, an alternate example embodiment is shown. In this example, the topmost part 86a, the top corners 86b and the top parts 86c of the sides of the suspension 82" forms the first section 86" and is soft. The other part 88" of the suspension 82" is harder. The circle 90 denotes the area that is supposed to provide the earpiece functionality. Referring also to FIG. 12, in the measurements shown the curve 96 represents frequency response of a mockup having a uniformly suspended window with a suspension made of material/structure similar to second section 88" but all around, and the curve 98 represents a similar type of mockup as in FIG. 11 provided with second section 88" and where the top edge suspension has the softer first section 86". The result as shown by curve 98 versus curve 96 is better low frequency reproduction and smoother response; a clearly better response below 4 kHz. This measurement was done using head and torso simulator (HATS).

Figure 13:
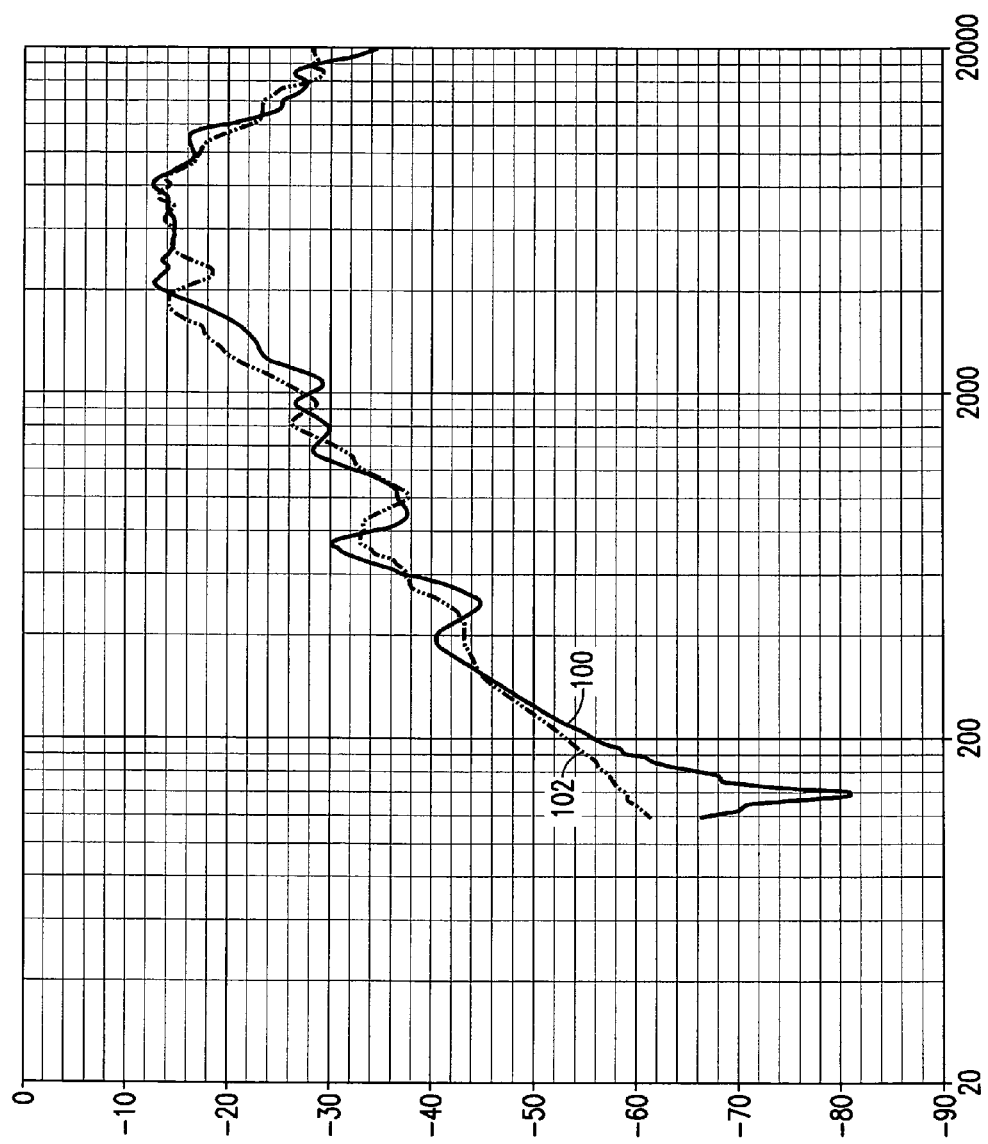
FIG. 13 is a graph representative of frequency responses of a uniformly suspended mockup similar to FIG. 12 with hard adhesive and the similar type of mockup where the top edge suspension has the first section as in FIG. 11 which is softer.

Referring also to FIG. 13, the curve 100 represents frequency response of a uniformly suspended mockup similar to FIG. 12 with hard adhesive and the curve 102 represents the similar type of mockup where the top edge suspension has the first section 86" as in FIG. 11 which is softer. The result with the softer first section 86" is better low frequency reproduction and smoother response. The mock-up is the same as in the embodiment of FIG. 8, but this was measured with microphone 5 mm above the display and not using HATS.

The selection of the actuator 75 and the location of the actuator 75 and other components, and their characteristics in device that have impact to audio quality, may impact the selection the material used for the suspension 82 sections, and the shape of the segmentation of the suspension. Also, the device size, the device chassis material and the display stack integration to the chassis or frame of the apparatus 10 may impact the segmentation of the suspension. Thus, there cannot be direct unvarying guidelines regarding the suspension segmentation. Its design is part of making an embedded device and iterative process may be used. For a starting point in this process, the following guidelines may be used for suspension segmentation:

- The larger the display, the shorter the soft part the suspension can be.
- The thinner the front glass is, the shorter the soft part of the suspension can be.
- The softer the cover material, the shorter the soft part of the suspension can be.
- The more flexible the display panel is, the shorter the soft part of the suspension can be.

A couple of example starting points for the iterative process may be, for example:

- The device has display size of 4.5 inches or less, glass thickness of 0.6 mm or thicker and metal cover—the Suspension shown in FIG. 11 may be best.
- The device has a display size of 6 inches or more, glass thickness of 0.5 mm or thinner and polycarbonate covers—the Suspension shown in FIG. 8 may be best.

The soft suspension material that has been used in devices in these measurements has been urethane foam called PORON, for example series 92 or series 60. Thickness of the soft suspension may be, for example, 0.3 mm, and there could be adhesive on both sides for fixing. Alternative materials for example, elastomers, TPE, TPU, silicone or rubber. The hard part of the suspension used in devices in these measurements has been normal Pressure Sensitive Adhesive tape. It could also be liquid glue or hot melt glue for example.

Figure 14:
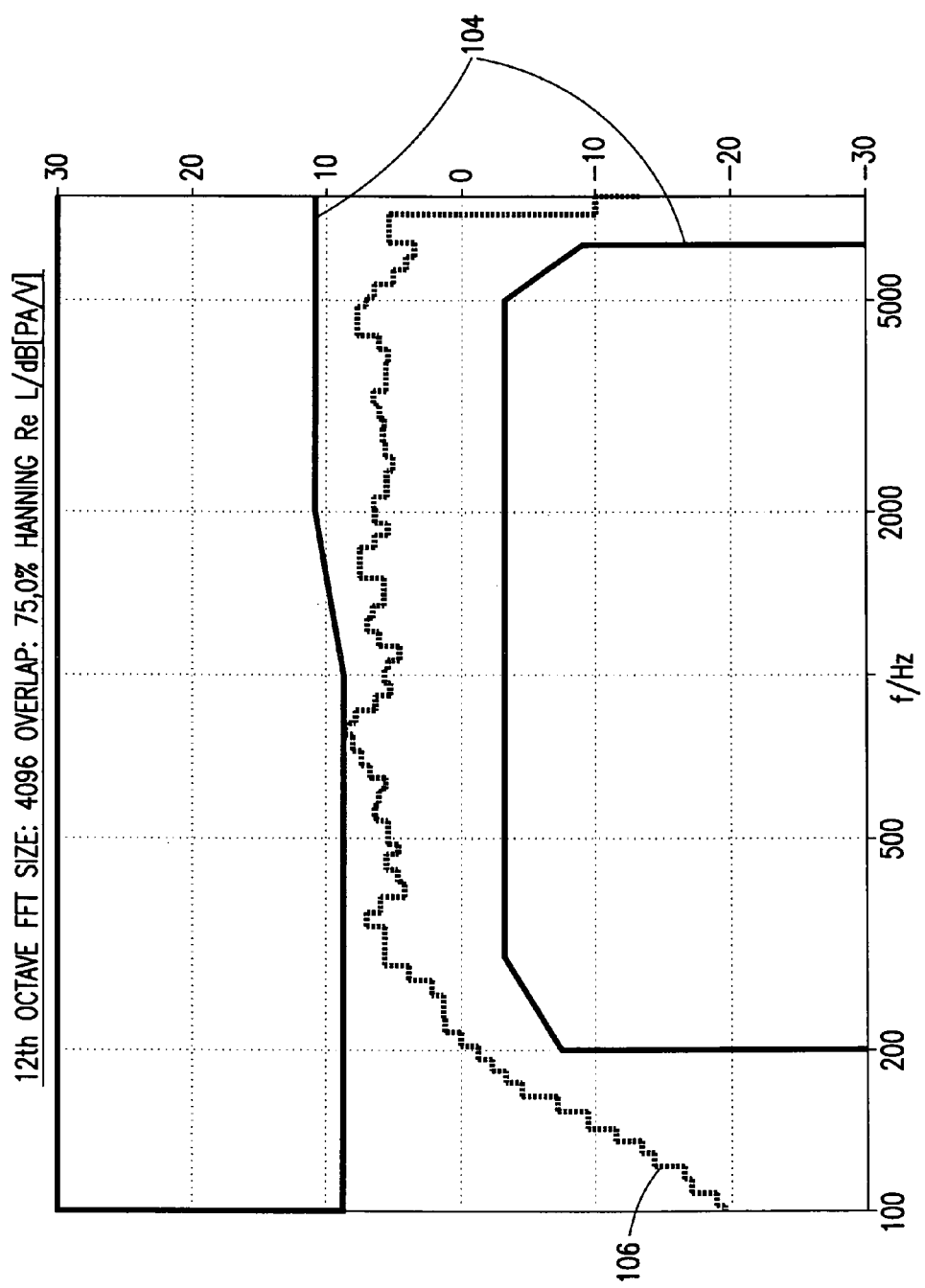
FIG. 14 is a chart of a frequency response for a panel speaker mock-up as in FIG. 8 for which audio tuning has been done to meet a telephony audio frequency mask.

Referring also to FIG. 14, a chart of a frequency response 106 is shown of a panel speaker mock-up for which audio tuning has been done to meet a telephony audio frequency mask 104. The segmentation of the suspension was as in FIG. 8, and the display size was 4.5 inches. The requirements of frequency mask 104 can be met even though the soft suspension segment 86 was smallish, but more equalization may be needed if the mechanics prevents proper output.

Figure 15:
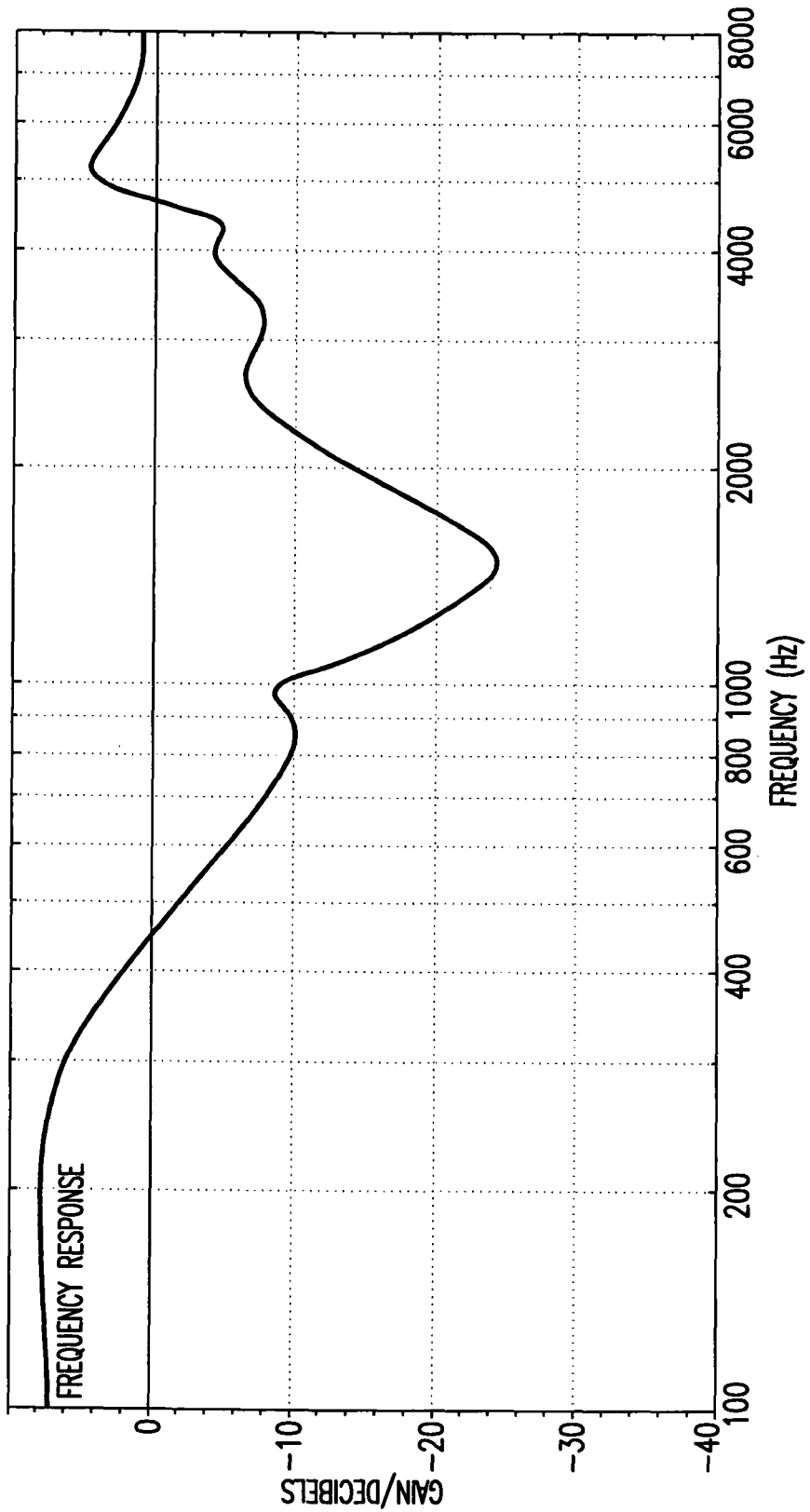
FIG. 15 is a graph showing an equalization curve which was used for the example of FIG. 14.

Referring also to FIG. 15, the equalization curve which was used is shown. If the soft suspension segment 86 would have been larger, less boost would have been needed in the low frequencies and, thus, avoiding the negative side effects of boosting such as increase of distortion.

The impact of providing a segmented Suspension may be used in regard to selection of the actuator 75. The improved performance provided by the softer suspension may be used for other purposes as well as better frequency response. Alternatively, the actuator can be less powerful and, therefore, smaller (in terms of volume and area) and more affordable.

It should be noted that the term "soft suspension" is intended to cover also the case where the display stack is freely floating in relation to the device cover. This is the most extreme type of soft suspension. It should be noted that the term "hard suspension" is intended to cover also the case where the display stack is firmly, stationarily fixed to the device cover. This is the most extreme type of hard suspension.

Figure 16:
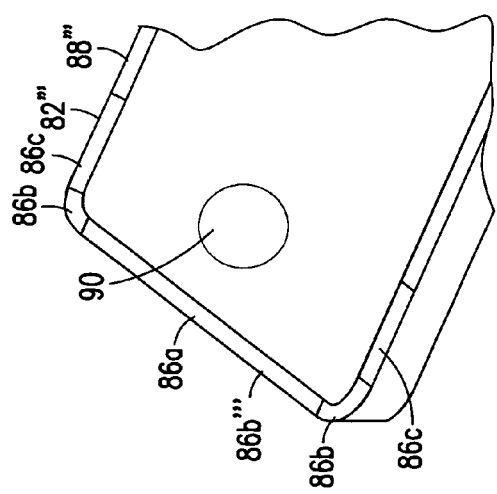
FIG. 16 is a partial perspective view similar to FIG. 8 of an alternate example embodiment.

Referring also to FIG. 16, another example embodiment is shown. In this example, the topmost part 86a, the top corners 86b and the top parts 86c of the sides of the first section 86''' of the suspension 82''' are soft, and the other part 88''' of the suspension is harder. The circle 90 denotes the area that is supposed to provide the earpiece functionality. In this example embodiment the different segments 86a, 86b, 86c have different suspension characteristics. For example, the material and/or the thickness of the segments 86a, 86b, 86c, and thus the softness and/or resilience of the segments 86a, 86b, 86c are at least partially different from one another. This may provide better options for suspension fine tuning.

Features as described herein may be used where the front glass of a device is driven using some type of actuator and, thus, providing audio as a replacement for a conventional earpiece transducer component. With a display panel speaker, the front glass or the combination or the glass and the display module may be driven under the glass or under the display module. As the driven panel provides audio reproduction, there is no need for a conventional earpiece. A problem in a performance-wise most optimal suspension is that it is either visible, it increases deadbands, increases thickness and/or requires more volume from the device. The problem in the simplicity-wise most optimal solution is that the audio performance suffers if the glass is firmly fixed to the device cover, although from the non-audio device design perspective firm fixing is the best option. A completely soft suspension feels "fluffy" in a user's hand, and may be perceived by the user a poor quality manufacture. The harder suspension 88 also has some benefit in regard to drop durability. If the suspension 82 is too soft the display assembly can, during a face down drop (display hitting first the ground), back lash touch the ground and result in the display being shattered. However, the soft suspension can have the advantage that the soft suspension absorbs kinetic energy, therefore, reducing the risk of a broken display. Drop durability may of course depend on the drop direction and on how the device is constructed.

Features as described herein seek to segment the suspension of a panel speaker in a device that has a display as part of the speaker. The suspension may be softer only in the areas where soft suspension is need due to better performance, and the suspension may be harder in the areas where softer suspension would not bring significant audio performance benefits. The harder suspension, however, brings a better quality feeling about the device by the user. Alternatively or additionally the performance improvement, the softer segment may be used to make the actuator 75 smaller and more affordable.

Best audio quality for a display panel speaker can be reached by "pistonic" movement of the whole front area of the display stack. However, features as described herein intentionally do not provided "pistonic" movement for the whole front area of the audio display 14. Instead, because of the segmented soft/hard suspension connection of the cover window 80 to the frame 12, a non-pistonic movement of the whole front area of the display stack is provided. The area 90 may move similar to pistonic, but the segmented soft/hard connection 82 allows the first end 15 to move more freely than the opposite second end 17. Features as described herein provide intentional dampening of a certain limited amount of suspension area, and a different area having less dampening. With features as described herein stiffer suspension in the area where it does not significantly negatively impact audio reproduction may be provided. The stiffer suspension provides a better quality feeling about the device by the user; feeling more solid. The softer suspension is only provided in the area where better audio reproduction is needed; at the end 15 having the area 90 for earpiece functionality. Features as described herein may provide segmented suspension in a device that has an actuator or actuators only in one first end of the device having the area 90 for earpiece functionality. Thus, stiffer suspension may be provided in the opposite other end that does not have an actuator, and perhaps middle. For a device that aims to have a pistonic movement of the whole display stack segment suspension as described herein would not provided.

An example embodiment may be provided in an apparatus comprising a frame; and a speaker connected to the frame, where the speaker comprises at one vibrating element and at least one display element comprising a window, where the at least one vibrating element is configured to at least partially move the at least one display element to generate sound waves from the at least one display element, where a connection of the speaker to the frame comprises a first section at a first location of the window and a different second section at a second location of the window, where the first section comprises a soft suspension of the window on the frame, where the second section comprises a harder suspension of the window on the frame than the first section, and where the at least one vibrating element is spaced from the second location of the window and located proximate the window at only the first location of the window. In different example embodiments the display module 14 itself, or the display window 80, or both, and/or a plate mechanically coupled to the display module (where the plate is actuated by said vibrating element) may configured to be moved by the at least one vibrating element. The first and second sections may at least partially overlap along the length of the outer perimeter of the window. More than two different suspension connection sections may be provided along the perimeter of the front window.

The first section may comprise a material which is more resilient than a material of the second section. The first section may comprise a material which is more soft than a material of the second section. The soft suspension of the window on the frame at the first section may comprise a free floating suspension of at least a portion of the first end of the window on the frame. The hard suspension of the window on the frame at the second section may comprise a stationary fixed connection of at least a portion of the second and of the window on the frame. The connection may comprise a first material forming the first section and a different second material forming the second section. The first section may comprise at least two portions along its length where each portion has a different resilience. The first section and/or the second section may bond the window to the frame. The first section of the connection may comprise at least one of urethane, elastomer, Thermoplastic elastomer (TPE), Thermoplastic polyurethane (TPU), silicon or rubber. The second section of the connection may comprise at least one of pressure sensitive adhesive tape, liquid glue or hot melt glue.

An example embodiment may be provided in an apparatus comprising a frame; a speaker comprising at least one vibrating element and at least one display element comprising a window, where the at least one vibrating element is configured to at least partially move the at least one display element to generate sound waves from the at least one display element; and a connector connecting the window to the frame. The connector may have a first section at a first location of the window and a different second section at a second location of the window, where the first section is more resilient than the second section, and where the at least one vibrating element is spaced from the second location of the window and located proximate the window at only the first location of the window.

The connector may comprise a gasket or suspension part or suspension module and, as used herein, these terms may be considered interchangeable in some example embodiments. The connector may comprise a first material forming the first section and a different second material forming the second section. The first section may comprise at least two portions along its length where each portion has a different resilience. The first section and/or the second section may bond the window to the frame. The first section of the connector may comprise at least one of urethane, elastomer, Thermoplastic elastomer (TPE), Thermoplastic polyurethane (TPU), silicon or rubber. The second section of the connector may comprise at least one of pressure sensitive adhesive tape, liquid glue or hot melt glue. The first section of the connector may be harder than the second section of the connector. The first section and the second section may be designed as a single part. However, an alternative embodiments, the first and second sections may be separate parts which may be joint/assembled together. In some example embodiments, the dimensions of the first and second sections may be different. For example, the section away from the vibrating element could have larger thickness. In some example embodiments, the profile (cross section area) of the first section could be different from the profile of the second section. More than two sections may also be provided.

An example method may comprise connecting a speaker to a frame by a connection, where the speaker comprises at least one vibrating element and at least one display element, where the at least one vibrating element is configured to at least partially move the at least one display element to generate sound waves from the at least one display element, where the connection has a first section at a first location of the window and a different second section at a second location of the window, where the first section comprises a soft suspension of the window on the frame, where the second section comprises a harder suspension of the window on the frame than the first section, and where the at least one vibrating element is spaced from the second location of the window and located proximate the window at only the first location of the window.

Connecting the speaker may comprise a material of the first section being more resilient than a material of the second section. The first section may comprise at least two portions along its length where each portion has a different resilience.

Figure 17:
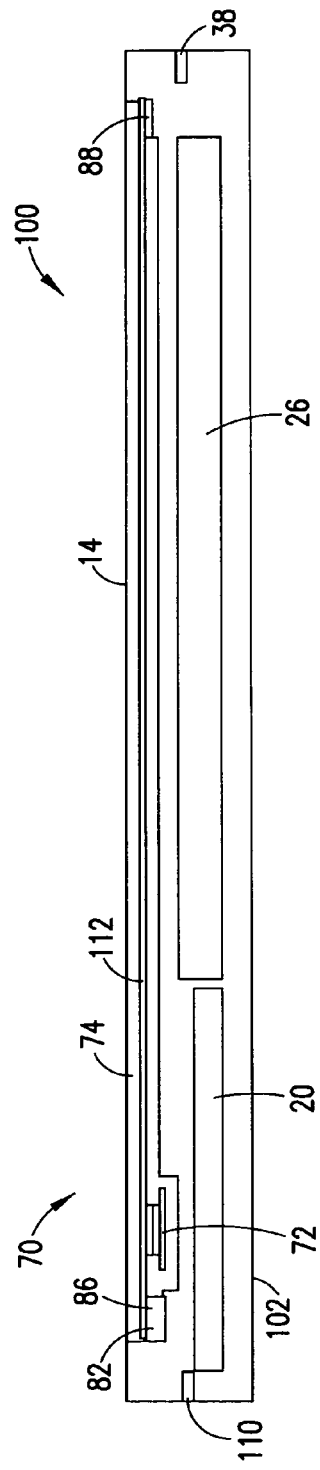
FIG. 17 is a schematic cross section view of an alternate example embodiment.

Referring also to FIG. 17, a schematic cross sectional view of the example embodiment of FIG. 8 is shown. The embodiment 100 in this example is a mobile telephone comprising a housing 102, the display module 14, the controller 20 comprising a printed circuit board, the rechargeable battery 26, and the main microphone 38. The display module 14 is an audio display forming the speaker 70 comprising the vibrating element 72 and the display element 74. The display element 74 comprises the electronic display, but no front window. The apparatus 100 includes at least one secondary microphone 110 which may be used for noise cancellation for example. In this example a shield can and stiffening plate 112 is located on the rear side of the display element 74. The vibrating element 72 is connected to the plate 112 proximate an earpiece function location similar to 90 shown in FIG. 8. The suspension connection 82 comprises the hard suspension 88 and the soft suspension 86. The soft suspension 86 will help to improve the low frequency output and reduce coupling of the main microphone 38 with the panel speaker 70. In this example no separate front window is provided. The suspension 82 is provided directly between the housing 102 and rear side of the plate 112. The suspension 82 could be provided directly between the housing 102 and the electronic display 74, such as when the plate 112 is not provided.

In another example embodiment the apparatus may comprise an additional front foil provided in front of the display module 14. The front foil may be, for example, a 50 µm-200 µm thick plastic sheet or glass foil. The front foil may be just a cosmetic foil or protective foil over the display module. The front foil does not have structural function such as the front window 80. The front foil may merely protect the display module 14 from dust ingress or scratches.

In one type of example embodiment the vibrating element 72 may be provided as a bi-morph piezo ceramic. The vibrating element 72 is attached to a display element 74, such as front window 80 or display module 14 for example, by a glue or adhesive. In another example embodiment, the vibrating element 72 may be provided as a uni-morph piezo. The vibrating element 72 is attached a display element 74, such as the front window 80 or the display module 14 for example, by a metal plate and a connecting pad, such as firm foam for example. The metal plate may fix the piezo 72 onto the body or chassis of the apparatus by fixings 210 for example. The bi-morph piezo (glass bender) which is attached onto the display element will try to bend or vibrate the display element, where the uni-morph (piezo bender) will try to push the display element. In both cases the segmented suspension is very beneficial for getting low frequency output.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
    a frame; and
    a speaker connected to the frame, where the speaker comprises at least one vibrating element and at least one display element, where the at least one vibrating element is configured to at least partially move the at least one display element to generate sound waves from the at least one display element,
    where a connection of the speaker to the frame comprises a first section at a first location of the at least one display element and a second section at a second location of the at least one display element, where the first section comprises a soft suspension of the at least one display element between the at least one display element and the frame, where the second section comprises a harder suspension of the at least one display element between the at least one display element and the frame than the first section, and where the at least one vibrating element is located away from the second location of the at least one display element and located proximate the at least one display element at the first location of the at least one display element so as to move the least one display element substantially using the first section based on the soft suspension of the at least one display element.

2. An apparatus as in claim 1 where the first section comprises a material which is more resilient than a material of the second section.

3. An apparatus as in claim 1 where the first section comprises a material which is softer than a material of the second section.

4. An apparatus as in claim 1 where the soft suspension of the at least one display element between the at least one display element and the frame at the first section comprises a floating suspension of at least a portion of the first end of the at least one display element between the at least one display element and the frame.

5. An apparatus as in claim 1 where the hard suspension of the at least one display element between the at least one display element and the frame at the second section comprises a stationary fixed connection of at least a portion of the second end of the at least one display element between the at least one display element and the frame.

6. An apparatus as in claim 1 where the connection comprises a first material forming the first section and a second material forming the second section.

7. An apparatus as in claim 1 where the first section comprises at least two portions along its length where each portion has a different resilience.

8. An apparatus as in claim 1 where the first section and/or the second section bond the at least cue display element to the frame.

9. An apparatus as in claim 1 where the first section of the connection comprises at least one of urethane, elastomer, Thermoplastic elastomer (TPE), Thermoplastic polyurethane (TPU), silicon or rubber, and the second section of the connection comprises at least one of pressure sensitive adhesive tape, liquid glue or hot melt glue.

10. An apparatus as in claim 1 further comprising:
    at least one printed wiring board, where the display element is connected to a first one of the at least one printed wiring board;
    a processor connected to the at least one printed wiring board;
    a memory comprising software connected to the at least one printed wiring board;
    a camera connected to the at least one printed wiring board; and
    a battery connected to the at least one printed wiring board.

11. An apparatus comprising:
    a frame;
    a speaker comprising least one vibrating element and at least one display element, where the at least one vibrating element is configured to at least partially move the at least one display element to generate sound waves from the at least one display element; and
    connector connecting the at least one display element to the frame,
    where the connector has a first section at a first location of the at least one display element and a second section at a second location of the at least one display element, where the first section is more resilient than the second section, and where the at least one vibrating element is spaced from the second location of the at least one display element and located proximate the at least one display element at the first location of the at least one display element so as to move the at least one display element substantially using the first section based on the soft suspension of the at least one display element.

12. An apparatus as in claim 11 where the connector comprises a first material forming the first section and a second material forming the second section.

13. An apparatus as in claim 11 where the first section comprises at least two portions along its length where each portion has a different resilience.

14. An apparatus as in claim 11 where the first section and/or the second section bond the at least one display element the frame.

15. An apparatus as in claim 11 where the first section of the connector comprises at least one of urethane, elastomer, Thermoplastic elastomer (TPE), Thermoplastic polyurethane (TPU), silicon or rubber.

16. An apparatus as in claim 15 where the second section of the connector comprises at least one of pressure sensitive adhesive tape, liquid glue or hot melt glue.

17. An apparatus as in claim 11 where the first section of the connector is harder than the second section of the connector.

18. A method comprising connecting a speaker to a frame by a connection, where the speaker comprises at least one vibrating element and at least one display element, where the at least one vibrating element is configured to at least partially move the at least one display element to generate sound waves from the at least one display element, where the connection has a first section at a first location of the at least one display element and a second section at a second location of the at least one display element, where the first section comprises a soft suspension of the at least one display element between the at least one display element and the frame, where the second section comprises a harder suspension of the at least one display element between the at least one display element and the frame than the first section, and where the at least one vibrating element is spaced from the second location of the at least one display element and located proximate the at least one display element at the first location of the at least one display element so as to move the at least one display element substantially using the first section based on the soft suspension of the at least one display element.

19. A method as in claim 18 where connecting the speaker comprises a material of the first section being more resilient than a material of the second section.

20. A method as in claim 18 where the first section comprises at least two portions along its length where each portion has a different resilience.

\* \* \* \* \*

UNITED STATES PATENT AND TRADEMARK OFFICE
CERTIFICATE OF CORRECTION

PATENT NO. : 9,137,592 B2  
APPLICATION NO. : 14/151328  
DATED : September 15, 2015  
INVENTOR(S) : Yliaho et al.

Page 1 of 1

It is certified that error appears in the above-identified patent and that said Letters Patent is hereby corrected as shown below:

In the claims

Claim 8, col. 12, line 20 "cue" should be deleted and --one-- should be inserted.

Claim 14, col. 12, line 67 --to-- should be inserted in between "element" and "the".

Signed and Sealed this  
Fifteenth Day of December, 2015

Michelle K. Lee  
*Director of the United States Patent and Trademark Office*